(12) United States Patent
Wu et al.

(10) Patent No.: US 11,778,585 B2
(45) Date of Patent: Oct. 3, 2023

(54) SIDELINK POSITIONING REFERENCE SIGNAL TRANSMISSION AND RECEPTION

(71) Applicant: QUALCOMM Incorporated, San Diego, CA (US)

(72) Inventors: Shuanshuan Wu, San Diego, CA (US); Arthur Gubeskys, San Diego, CA (US); Kapil Gulati, Belle Mead, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/305,374

(22) Filed: Jul. 6, 2021

(65) Prior Publication Data

US 2023/0007956 A1    Jan. 12, 2023

(51) Int. Cl.
| | |
|---|---|
| *H04W 24/10* | (2009.01) |
| *H04W 64/00* | (2009.01) |
| *H04W 72/04* | (2023.01) |
| *H04L 5/00* | (2006.01) |
| *H04W 72/1263* | (2023.01) |

(52) U.S. Cl.
CPC ......... *H04W 64/006* (2013.01); *H04L 5/0051* (2013.01); *H04W 24/10* (2013.01); *H04W 72/1263* (2013.01)

(58) Field of Classification Search
None
See application file for complete search history.

(56) References Cited

U.S. PATENT DOCUMENTS

2021/0185632 A1 *   6/2021   Manolakos ........... H04L 1/0013

FOREIGN PATENT DOCUMENTS

WO    WO-2021023822 A1 *   2/2021   ........... G01S 13/765

* cited by examiner

*Primary Examiner* — Scott M Sciacca
(74) *Attorney, Agent, or Firm* — Harrity & Harrity, LLP

(57) ABSTRACT

Various aspects of the present disclosure generally relate to wireless communication. In some aspects, a transmitter user equipment (UE) may detect an available bandwidth for transmission of a sidelink positioning reference signal. The transmitter UE may transmit the sidelink positioning reference signal in the available bandwidth, wherein a duration of the sidelink positioning reference signal is based at least in part on the available bandwidth. Numerous other aspects are described.

30 Claims, 10 Drawing Sheets

SIDELINK POSITIONING REFERENCE SIGNAL TRANSMISSION AND RECEPTION

FIELD OF THE DISCLOSURE

Aspects of the present disclosure generally relate to wireless communication and to techniques and apparatuses for sidelink positioning reference signal transmission and reception.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. NR, which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a transmitter user equipment (UE). The method may include detecting an available bandwidth for transmission of a sidelink positioning reference signal. The method may include transmitting the sidelink positioning reference signal in the available bandwidth, wherein a duration of the sidelink positioning reference signal is based at least in part on the available bandwidth.

Some aspects described herein relate to a method of wireless communication performed by a receiver UE. The method may include determining a bandwidth used for a transmission of a sidelink positioning reference signal. The method may include determining a duration of the sidelink positioning reference signal based at least in part on the bandwidth. The method may include measuring the sidelink positioning reference signal based at least in part on the bandwidth and the duration.

Some aspects described herein relate to a transmitter UE for wireless communication. The transmitter UE may include a memory and one or more processors coupled to the memory. The one or more processors may be configured to detect an available bandwidth for transmission of a sidelink positioning reference signal. The one or more processors may be configured to transmit the sidelink positioning reference signal in the available bandwidth, wherein a duration of the sidelink positioning reference signal is based at least in part on the available bandwidth.

Some aspects described herein relate to a receiver UE for wireless communication. The receiver UE may include a memory and one or more processors coupled to the memory. The one or more processors may be configured to determine a bandwidth used for a transmission of a sidelink positioning reference signal. The one or more processors may be configured to determine a duration of the sidelink positioning reference signal based at least in part on the bandwidth. The one or more processors may be configured to measure the sidelink positioning reference signal based at least in part on the bandwidth and the duration.

Some aspects described herein relate to a non-transitory computer-readable medium that stores a set of instructions for wireless communication by a transmitter UE. The set of instructions, when executed by one or more processors of the transmitter UE, may cause the transmitter UE to detect an available bandwidth for transmission of a sidelink positioning reference signal. The set of instructions, when executed by one or more processors of the transmitter UE, may cause the transmitter UE to transmit the sidelink positioning reference signal in the available bandwidth, wherein a duration of the sidelink positioning reference signal is based at least in part on the available bandwidth.

Some aspects described herein relate to a non-transitory computer-readable medium that stores a set of instructions for wireless communication by a receiver UE. The set of instructions, when executed by one or more processors of the receiver UE, may cause the receiver UE to determine a bandwidth used for a transmission of a sidelink positioning reference signal. The set of instructions, when executed by one or more processors of the receiver UE, may cause the receiver UE to determine a duration of the sidelink positioning reference signal based at least in part on the bandwidth. The set of instructions, when executed by one or more processors of the receiver UE, may cause the receiver UE to measure the sidelink positioning reference signal based at least in part on the bandwidth and the duration.

Some aspects described herein relate to an apparatus for wireless communication. The apparatus may include means for detecting an available bandwidth for transmission of a sidelink positioning reference signal. The apparatus may include means for transmitting the sidelink positioning reference signal in the available bandwidth, wherein a duration of the sidelink positioning reference signal is based at least in part on the available bandwidth.

Some aspects described herein relate to an apparatus for wireless communication. The apparatus may include means for determining a bandwidth used for a transmission of a sidelink positioning reference signal. The apparatus may include means for determining a duration of the sidelink positioning reference signal based at least in part on the bandwidth. The apparatus may include means for measuring the sidelink positioning reference signal based at least in part on the bandwidth and the duration.

Aspects generally include a method, apparatus, system, computer program product, non-transitory computer-readable medium, user equipment, transmitter user equipment, receiver user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
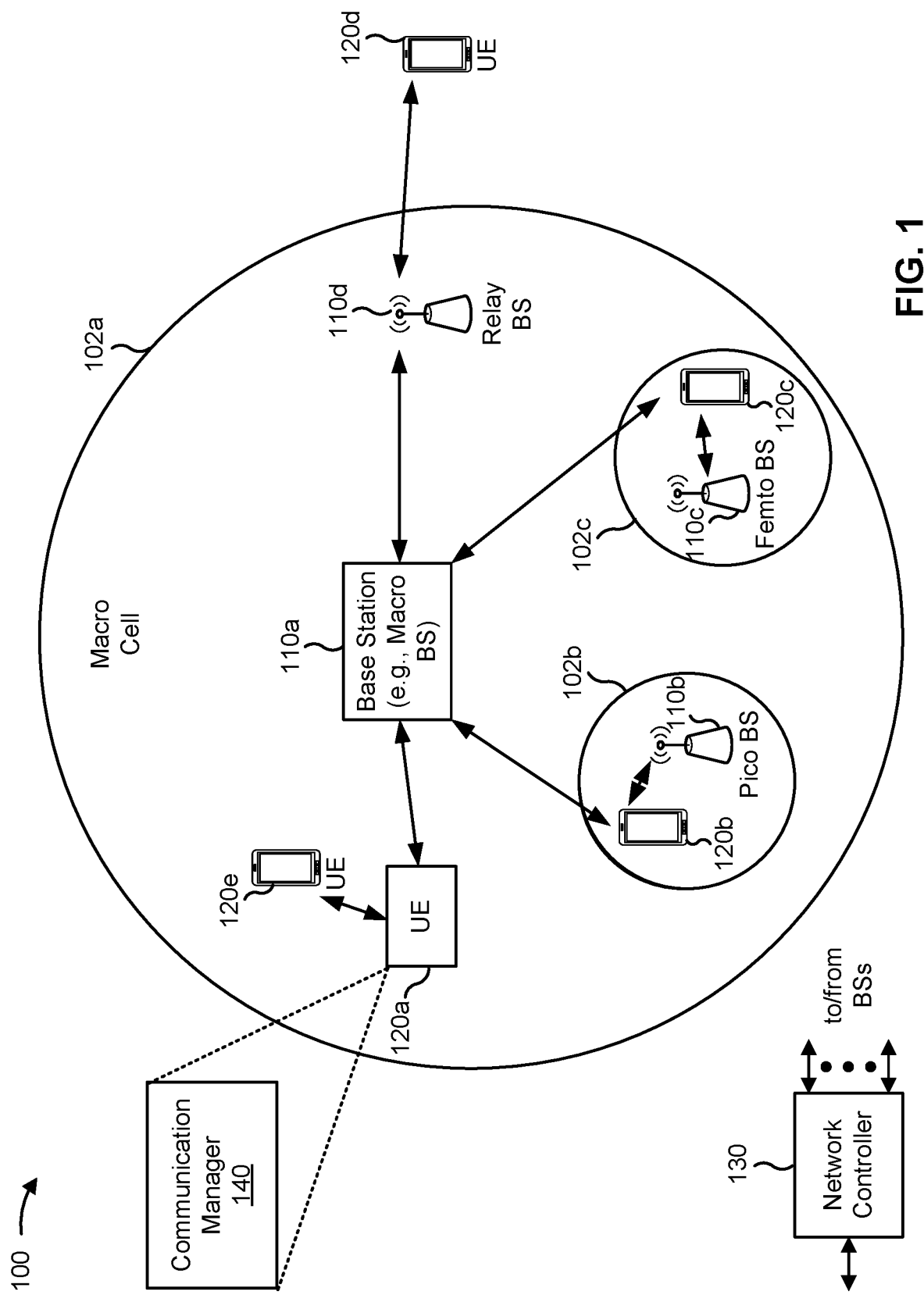
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a roadside unit (RSU), and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may detect an available bandwidth for transmission of a sidelink positioning reference signal; and transmit the sidelink positioning reference signal in the available bandwidth, wherein a duration of the sidelink positioning reference signal is based at least in part on the available bandwidth. Additionally, or alternatively, the communication manager 140 may determine a bandwidth used for a transmission of a sidelink positioning reference signal; determine a duration of the sidelink positioning reference signal based at least in part on the bandwidth; and measure the sidelink positioning reference signal based at least in part on the bandwidth and the duration. Additionally, or alternatively, the communication manager 140 may perform one or more other operations described herein.

As indicated above, FIG. 1 is provided as an example. Other examples may differ from what is described with regard to FIG. 1.

Figure 2:
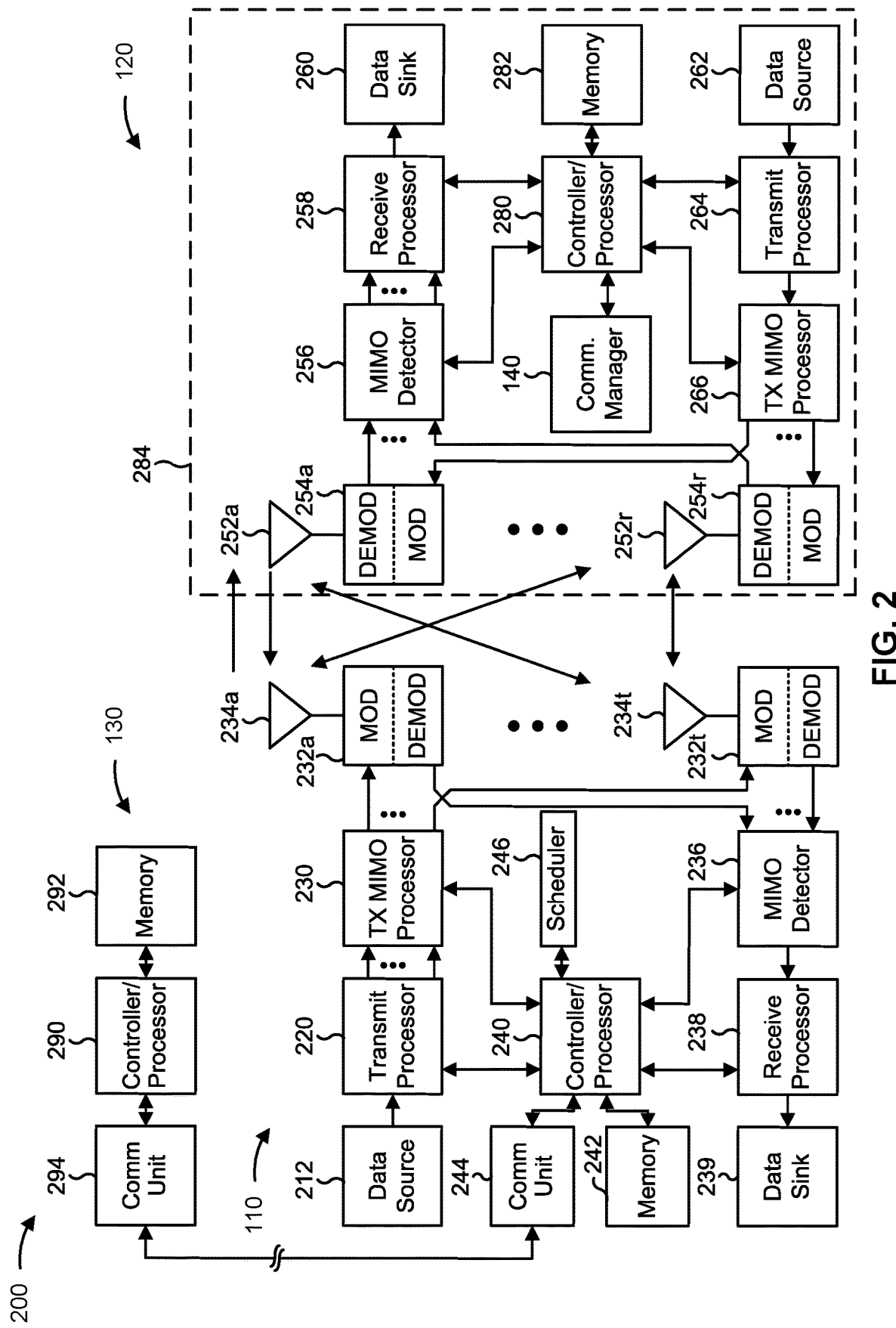
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The UE 120 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234*a* through 234*t* and/or antennas 252*a* through 252*r*) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 5-8).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 5-8).

The controller/processor 240 of the base station 110, the controller/processor 280 of the UE 120, and/or any other component(s) of FIG. 2 may perform one or more techniques associated with sidelink positioning reference signal transmission and reception, as described in more detail elsewhere herein. For example, the controller/processor 240 of the base station 110, the controller/processor 280 of the UE 120, and/or any other component(s) of FIG. 2 may perform or direct operations of, for example, process 700 of FIG. 7, process 800 of FIG. 8, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 700 of FIG. 7, process 800 of FIG. 8, and/or other processes as described herein. In some examples, executing instructions may include running the instructions, converting the instructions, compiling the instructions, and/or interpreting the instructions, among other examples.

In some aspects, the UE (e.g., a transmitter UE) includes means for detecting an available bandwidth for transmission of a sidelink positioning reference signal; and/or means for transmitting the sidelink positioning reference signal in the available bandwidth, wherein a duration of the sidelink positioning reference signal is based at least in part on the available bandwidth. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the UE (e.g., a receiver UE) includes means for determining a bandwidth used for a transmission of a sidelink positioning reference signal; and/or means for determining a duration of the sidelink positioning reference signal based at least in part on the bandwidth; and/or means for measuring the sidelink positioning reference signal based at least in part on the bandwidth and the duration. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
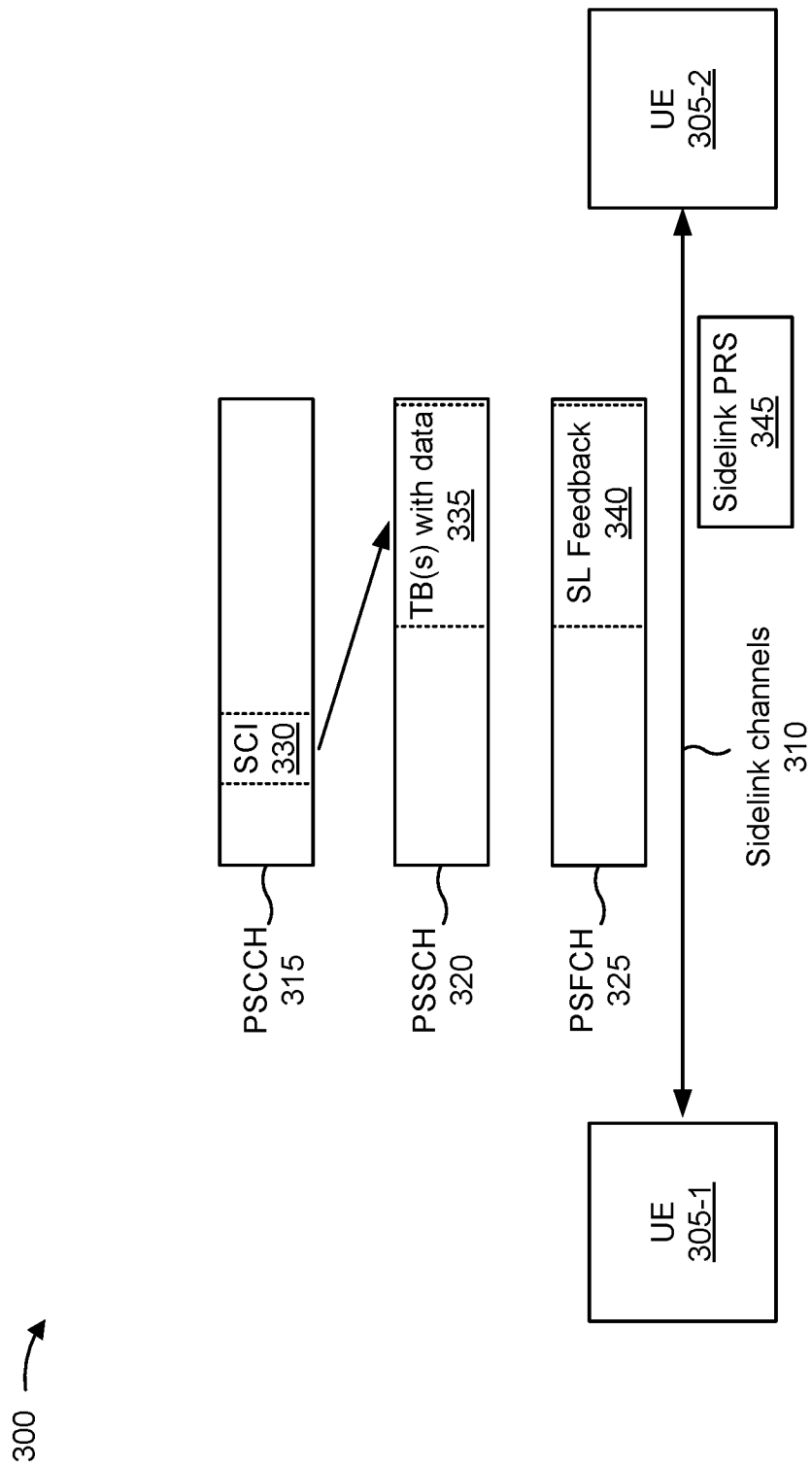
FIG. 3 is a diagram illustrating an example of sidelink communications, in accordance with the present disclosure.

FIG. 3 is a diagram illustrating an example 300 of sidelink communications, in accordance with the present disclosure.

As shown in FIG. 3, a first UE 305-1 may communicate with a second UE 305-2 (and one or more other UEs 305) via one or more sidelink channels 310. The UEs 305-1 and 305-2 may communicate using the one or more sidelink channels 310 for P2P communications, D2D communications, V2X communications (e.g., which may include V2V communications, V21 communications, and/or V2P communications) and/or mesh networking. In some aspects, the UEs 305 (e.g., UE 305-1 and/or UE 305-2) may correspond to one or more other UEs described elsewhere herein, such as UE 120. In some aspects, the one or more sidelink channels 310 may use a PC5 interface and/or may operate in a high frequency band (e.g., the 5.9 GHz band). Additionally, or alternatively, the UEs 305 may synchronize timing of transmission time intervals (TTIs) (e.g., frames, subframes, slots, or symbols) using global navigation satellite system (GNSS) timing.

As further shown in FIG. 3, the one or more sidelink channels 310 may include a physical sidelink control channel (PSCCH) 315, a physical sidelink shared channel (PSSCH) 320, and/or a physical sidelink feedback channel (PSFCH) 325. The PSCCH 315 may be used to communicate control information, similar to a physical downlink control channel (PDCCH) and/or a physical uplink control channel (PUCCH) used for cellular communications with a base station 110 via an access link or an access channel. The PSSCH 320 may be used to communicate data, similar to a physical downlink shared channel (PDSCH) and/or a physical uplink shared channel (PUSCH) used for cellular communications with a base station 110 via an access link or an access channel. For example, the PSCCH 315 may carry sidelink control information (SCI) 330, which may indicate various control information used for sidelink communications, such as one or more resources (e.g., time resources, frequency resources, and/or spatial resources) where a transport block (TB) 335 may be carried on the PSSCH 320. The TB 335 may include data. The PSFCH 325 may be used to communicate sidelink feedback 340, such as hybrid automatic repeat request (HARQ) feedback (e.g., acknowledgement or negative acknowledgement (ACK/NACK) information), transmit power control (TPC), and/or a scheduling request (SR).

Although shown on the PSCCH 315, in some aspects, the SCI 330 may include multiple communications in different stages, such as a first stage SCI (SCI-1) and a second stage SCI (SCI-2). The SCI-1 may be transmitted on the PSCCH 315. The SCI-2 may be transmitted on the PSSCH 320. The SCI-1 may include, for example, an indication of one or more resources (e.g., time resources, frequency resources, and/or spatial resources) on the PSSCH 320, information for decoding sidelink communications on the PSSCH, a quality of service (QoS) priority value, a resource reservation period, a PSSCH DMRS pattern, an SCI format for the SCI-2, a beta offset for the SCI-2, a quantity of PSSCH DMRS ports, and/or an MCS. The SCI-2 may include information associated with data transmissions on the PSSCH 320, such as a HARQ process ID, a new data indicator (NDI), a source identifier, a destination identifier, and/or a channel state information (CSI) report trigger.

In some aspects, the one or more sidelink channels 310 may use resource pools. For example, a scheduling assignment (e.g., included in SCI 330) may be transmitted in sub-channels using specific resource blocks (RBs) across time. In some aspects, data transmissions (e.g., on the PSSCH 320) associated with a scheduling assignment may occupy adjacent RBs in the same subframe as the scheduling assignment (e.g., using frequency division multiplexing). In some aspects, a scheduling assignment and associated data transmissions are not transmitted on adjacent RBs.

In some aspects, a UE 305 may operate using a transmission mode where resource selection and/or scheduling is performed by the UE 305 (e.g., rather than a base station 110). In some aspects, the UE 305 may perform resource selection and/or scheduling by sensing channel availability for transmissions. For example, the UE 305 may measure an RSSI parameter (e.g., a sidelink-RSSI (S-RSSI) parameter) associated with various sidelink channels, may measure an RSRP parameter (e.g., a PSSCH-RSRP parameter) associated with various sidelink channels, and/or may measure an RSRQ parameter (e.g., a PSSCH-RSRQ parameter) associated with various sidelink channels, and may select a channel for transmission of a sidelink communication based at least in part on the measurement(s).

Additionally, or alternatively, the UE 305 may perform resource selection and/or scheduling using SCI 330 received in the PSCCH 315, which may indicate occupied resources and/or channel parameters. Additionally, or alternatively, the UE 305 may perform resource selection and/or scheduling by determining a channel busy rate (CBR) associated with various sidelink channels, which may be used for rate control (e.g., by indicating a maximum number of resource blocks that the UE 305 can use for a particular set of subframes).

In the transmission mode where resource selection and/or scheduling is performed by a UE 305, the UE 305 may generate sidelink grants, and may transmit the grants in SCI 330. A sidelink grant may indicate, for example, one or more parameters (e.g., transmission parameters) to be used for an upcoming sidelink transmission, such as one or more resource blocks to be used for the upcoming sidelink transmission on the PSSCH 320 (e.g., for TBs 335), one or more subframes to be used for the upcoming sidelink transmission, and/or an MCS to be used for the upcoming sidelink transmission. In some aspects, a UE 305 may generate a sidelink grant that indicates one or more parameters for semi-persistent scheduling (SPS), such as a periodicity of a sidelink transmission. Additionally, or alternatively, the UE 305 may generate a sidelink grant for event-driven scheduling, such as for an on-demand sidelink message.

For some sidelink use cases, it may be important for a UE to be able to determine a physical location (or position) of another UE, such as an absolute position (e.g., geographic coordinates) or a relative position (e.g., between UEs), with a high degree of accuracy. For example, in a V2X communication system, highly accurate position determination may be necessary to avoid collisions between vehicles. As another example, in an industrial setting, highly accurate position determination may be necessary to avoid collisions between robots or other machinery. In some examples, GNSS positioning may be used, but this may not provide a high enough degree of accuracy or precision in some scenarios.

As shown by reference number 345, to provide more accurate position determination, one or more sidelink positioning reference signals (PRSs) may be introduced to allow UEs to indicate their position to one another. For example, a sidelink PRS may be based at least in part on one or more measurements of a time of arrival (ToA) of one or more signals, a time difference of arrival (TDoA) of one or more signals, an angle of arrival (AoA) of one or more signals, and/or a round trip time (RTT) of one or more signals.

The accuracy of a position determination that is determined from a sidelink PRS may depend on a bandwidth used for transmission of the sidelink PRS because the likelihood of accurate measurement of the PRS increases as the amount of bandwidth used for transmission of the PRS increases. Due to accuracy requirements of some sidelink applications (e.g., V2X), which may require sub-meter accuracy to support vehicle maneuver coordination, a very large bandwidth may be required for transmission and measurements of sidelink PRSs, such as 80 MHz or higher. However, the RF spectrum used for transmission of sidelink communications may not have such high bandwidth availability. For example, in a licensed RF spectrum (e.g., when sidelink communications share spectrum with licensed cellular communications) and/or in an intelligent transportation system (ITS) spectrum (e.g., dedicated to sidelink communications), there may be only 20-30 MHz bandwidth available for sidelink communications. To enable the possibility of higher available bandwidth for sidelink PRSs, unlicensed RF spectrum (e.g., a UN-II 3 band or a UN-II 5 band) may be used to transmit sidelink PRSs. In some examples, a UE may determine an amount of available bandwidth on the unlicensed RF spectrum by performing a channel access procedure, such as a listen before talk (LBT) procedure (e.g., CAT 1 LBT, CAT 2 LBT, CAT 3 LBT, or CAT 4 LBT), a channel sensing procedure, or another type of channel access procedure to contend for and/or gain access to the unlicensed RF spectrum for transmission of a sidelink communication.

An unlicensed RF spectrum band may be an RF spectrum band that is open for shared use by any device that complies with regulatory agency rules for communicating via the RF spectrum band. In contrast with most licensed RF spectrum band usage, users of unlicensed RF spectrum bands do not typically have regulatory protection against radio interference from devices of other users. In other words, devices that use the unlicensed RF spectrum band must typically accept any radio interference caused by other devices that use the unlicensed RF spectrum band. Thus, because unlicensed RF spectrum may be shared by other RATs (e.g., Wi-Fi) and because access to unlicensed RF spectrum may be subject to regulatory requirements, the available bandwidth for transmission of a sidelink PRS on the unlicensed RF spectrum may vary over time.

One way to improve accuracy of positioning using a sidelink PRS transmitted using the unlicensed RF spectrum may include waiting to transmit the sidelink PRS until a threshold amount of bandwidth is available on the unlicensed RF spectrum for transmission of the sidelink PRS. However, sidelink applications that require highly accurate positioning may also be time-sensitive (e.g., depending on a QoS requirement and/or a speed of a UE). For example, delaying a position determination in V2X may lead to vehicle collisions because the vehicle locations change over time. To reduce delays in position determination, it may be beneficial to transmit a sidelink PRS earlier in time when sufficient bandwidth for accurate position determination is not available. Some techniques and apparatuses described herein enable flexible transmission of sidelink PRS to improve accuracy of position determinations, such as by using a longer PRS transmission duration to compensate for noise, interference, and/or jitter when a smaller bandwidth is used to transmit the sidelink PRS.

Furthermore, the time resources and frequency resources used for transmissions on the unlicensed RF spectrum may be uncertain due to sharing of the unlicensed RF spectrum with other communication devices. As a result, a time and frequency used for transmission of a sidelink PRS may vary over time and in different conditions. Some techniques and apparatuses described herein enable indications and signaling associated with sidelink PRS to improve reception of sidelink PRS, resulting in more accurate position determinations.

As indicated above, FIG. 3 is provided as an example. Other examples may differ from what is described with respect to FIG. 3.

Figure 4:
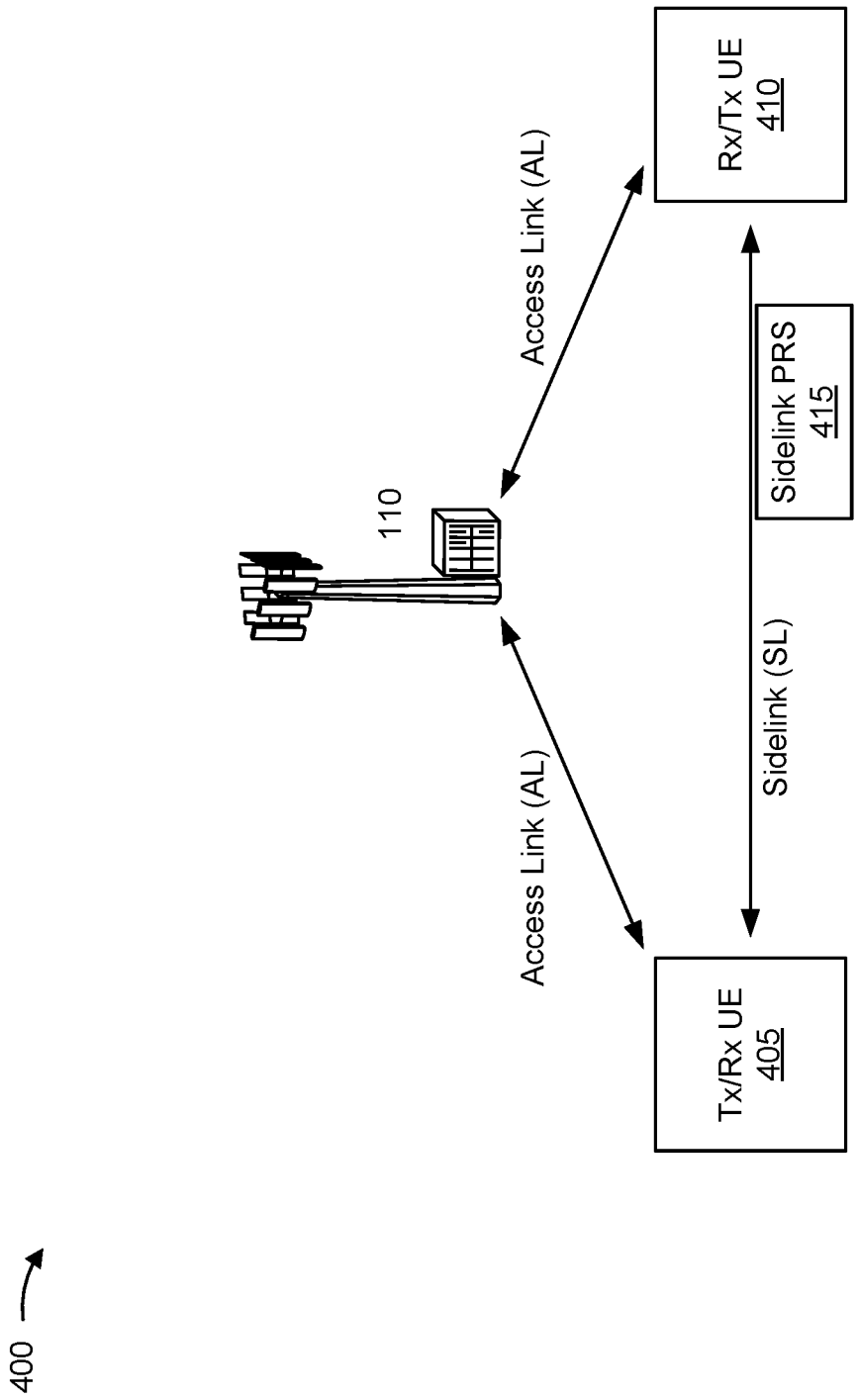
FIG. 4 is a diagram illustrating an example of sidelink communications and access link communications, in accordance with the present disclosure.

FIG. 4 is a diagram illustrating an example 400 of sidelink communications and access link communications, in accordance with the present disclosure.

As shown in FIG. 4, a transmitter (Tx)/receiver (Rx) UE 405 and an Rx/Tx UE 410 may communicate with one another via a sidelink, as described above in connection with FIG. 3. As further shown, in some sidelink modes, a base station 110 may communicate with the Tx/Rx UE 405 via a first access link. Additionally, or alternatively, in some sidelink modes, the base station 110 may communicate with the Rx/Tx UE 410 via a second access link. The Tx/Rx UE 405 and/or the Rx/Tx UE 410 may correspond to one or more UEs described elsewhere herein, such as the UE 120 of FIG. 1. Thus, a direct link between UEs 120 (e.g., via a PC5 interface) may be referred to as a sidelink, and a direct link between a base station 110 and a UE 120 (e.g., via a Uu interface) may be referred to as an access link. Sidelink communications may be transmitted via the sidelink, and access link communications may be transmitted via the access link. An access link communication may be either a downlink communication (from a base station 110 to a UE 120) or an uplink communication (from a UE 120 to a base station 110).

As shown by reference number 415, to provide more accurate position determination, one or more PRSs may be introduced to allow UEs to indicate their position to one another. Some techniques and apparatuses described herein enable flexible transmission of sidelink PRS to improve accuracy of position determinations. Furthermore, some techniques and apparatuses described herein enable indications and signaling associated with sidelink PRS to improve reception of sidelink PRS, resulting in more accurate position determinations. Some techniques and apparatuses described herein are applicable to a first scenario where sidelink UEs are in communication with a base station 110 (e.g., via one or more access links), and some techniques and apparatuses described herein are applicable to a second scenario where sidelink UEs are not in communication with a base station 110.

As indicated above, FIG. 4 is provided as an example. Other examples may differ from what is described with respect to FIG. 4.

Figure 5:
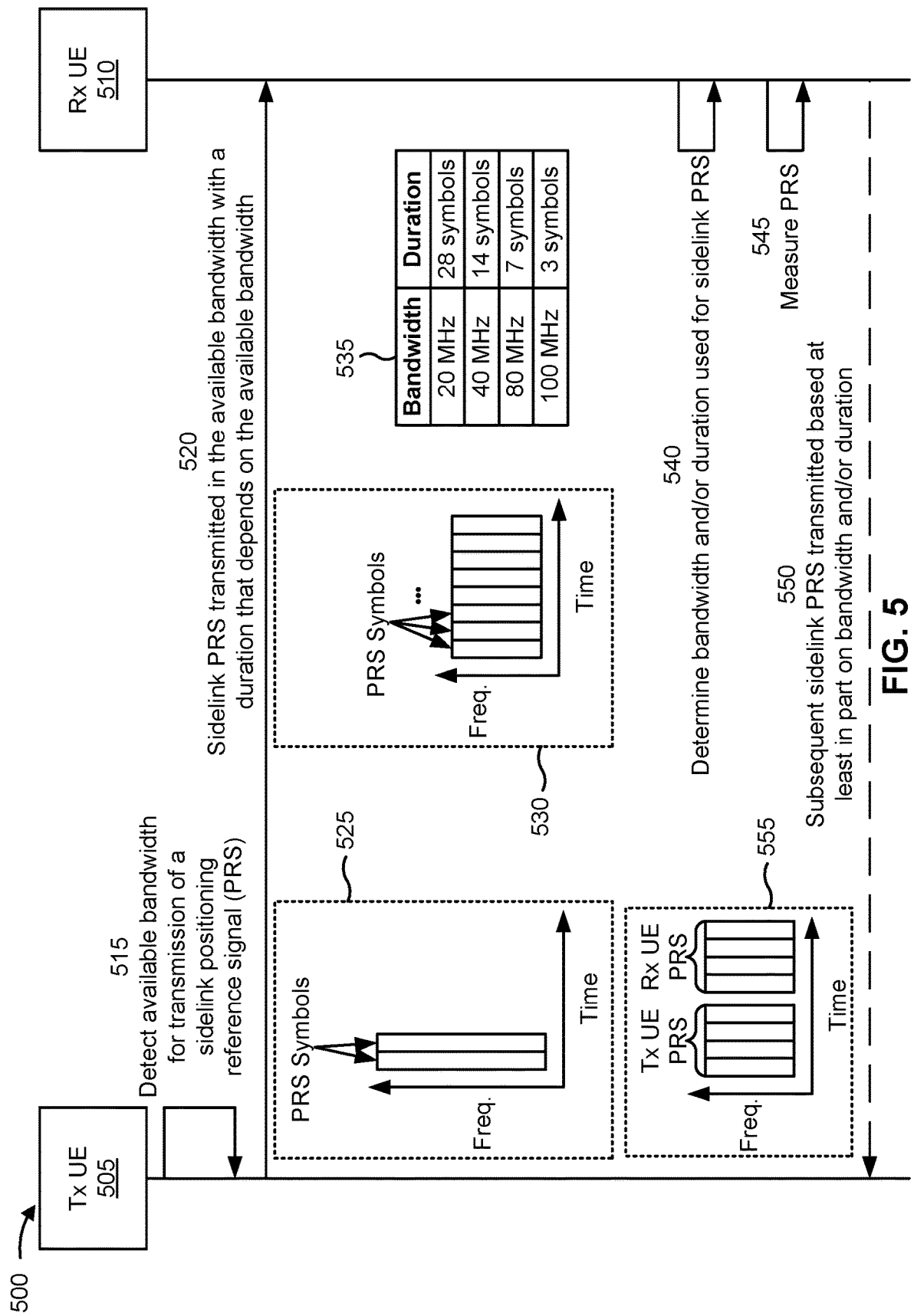
FIGS. 5 and 6 are diagrams illustrating examples associated with sidelink positioning reference signal transmission and reception, in accordance with the present disclosure.

FIG. 5 is a diagram illustrating an example 500 associated with sidelink positioning reference signal transmission and reception, in accordance with the present disclosure. As shown in FIG. 5, a transmitter (Tx) UE 505 and a receiver (Rx) UE 510 may communicate with one another.

As shown by reference number 515, the Tx UE 505 may detect (e.g., using communication manager 140, detection component 908, and/or controller/processor 280) an available bandwidth for transmission of a sidelink PRS. For example, the Tx UE 505 may scan one or more wireless communication channels (e.g., RF channels) to detect a bandwidth of one or more channels available for transmission. In some aspects, the Tx UE 505 may scan one or more unlicensed RF spectrum bands to identify an available bandwidth. For example, the Tx UE 505 may perform a channel access procedure (e.g., an LBT procedure and/or a channel sensing procedure) in the unlicensed RF spectrum band to detect the available bandwidth. In this example, the Tx UE 505 may perform a channel access procedure on a set of candidate channels (e.g., N contiguous or non-contiguous channels) to identify one or more channels (e.g., M contiguous or non-contiguous channels, where M≤N), in the set, that are available for a transmission by the Tx UE 505 (e.g., for which a sensed level of energy is less than or equal to a threshold). The Tx UE 505 may determine the bandwidth of the one or more channels. In some aspects, the one or more channels may be contiguous. In this example, the Tx UE 505 may identify an available bandwidth of a set of contiguous channels of an RF spectrum band being used by the Tx UE 505 for sidelink communications (e.g., an unlicensed RF spectrum band). In some aspects, the Tx UE 505 may perform a channel access procedure in a set of channels (e.g., in the unlicensed RF spectrum band) until the channel access procedure succeeds in a number of channels that satisfies a threshold (e.g., is greater than or equal to M). In this example, the available bandwidth may be a bandwidth of the number of channels (e.g., a combined bandwidth of the channels). In some aspects, the threshold may be specified in a wireless communication standards (and stored, hard-coded, or programmed in memory of the Tx UE 505). Additionally, or alternatively, the threshold many be indicated to the Tx UE 505 by a base station (e.g., in a configuration message) or by another UE 120.

As shown by reference number 520, the Tx UE 505 may transmit (e.g., using communication manager 140, transmission component 904, and/or controller/processor 280) the sidelink PRS in the available bandwidth (e.g., using all or a portion of the channels that the Tx UE 505 determined are available). As further shown, a duration of the sidelink PRS (e.g., a length of time that the sidelink PRS is transmitted) may be based at least in part on the available bandwidth. For a longer duration PRS, the Tx UE 505 may transmit the PRS for a longer period of time and/or using a larger number of repetitions of the PRS. For a shorter duration PRS, the Tx UE 505 may transmit the PRS for a shorter period of time and/or using a smaller number of repetitions of the PRS. The Tx UE 505 may transmit the sidelink PRS (e.g., to one or more other UEs 120, such as the Rx UE 510) in a sidelink channel.

In some aspects, the duration of the sidelink PRS is shorter when the available bandwidth is larger, and the duration of the sidelink PRS is longer when the available bandwidth is smaller. For example, as shown by reference number 525, the Tx UE 505 may transmit the sidelink PRS in a smaller number of symbols (or a smaller number of time domain resources), shown as PRS symbols, when the sidelink PRS is transmitted using a larger bandwidth (e.g., a larger number of frequency domain resources). As shown by reference number 530, the Tx UE 505 may transmit the sidelink PRS in a larger number of symbols (or a larger number of time domain resources) when the sidelink PRS is transmitted using a smaller bandwidth (e.g., a smaller number of frequency domain resources). In this way, time domain resources can be conserved while maintaining positioning accuracy when there are more frequency domain resources available for sidelink PRS transmission, and positioning accuracy can be improved by using more time domain resources for sidelink PRS transmission when there are fewer frequency domain resources available for sidelink PRS transmission.

In some aspects, the Tx UE 505 may determine the duration to be used for transmission of the sidelink PRS based at least in part on a mapping between a set of bandwidths and a corresponding set of durations. As shown by reference number 535, in an example mapping, the sidelink PRS may have a duration of 28 symbols when the available bandwidth is 20 MHz (e.g., a single channel of 20 MHz), the sidelink PRS may have a duration of 14 symbols when the available bandwidth is 40 MHz (e.g., two channels of 20 MHz each), the sidelink PRS may have a duration of 7 symbols when the available bandwidth is 80 MHz (e.g., four channels of 20 MHz each), and the sidelink PRS may have a duration of 3 symbols when the available bandwidth is 100 MHz (e.g., five channels of 20 MHz each). These durations and corresponding bandwidths are provided as examples, and other examples may differ from these. For example, the Tx UE 505 may determine a first duration for a bandwidth that fails to satisfy a first threshold, may determine a second duration for a bandwidth that satisfies the first threshold and fails to satisfy a second threshold, may determine a third duration for a bandwidth that satisfies the second threshold and fails to satisfy a third threshold, and so on.

In some aspects, the mapping (e.g., information that indicates the mapping) may be stored, hard-coded, pre-configured, and/or programmed in memory of the Tx UE 505 (e.g., when the Tx UE 505 is manufactured). For example, the mapping may be specified or fixed according to a wireless communication standard (e.g., a 3GPP standard), and the mapping may be stored in memory of the Tx UE 505 to comply with the wireless communication standard. Additionally, or alternatively, the Tx UE 505 may receive a signaling message that indicates the mapping. For example, the Tx UE 505 may receive a configuration message (e.g., a radio resource control (RRC) configuration message) from a base station 110 (e.g., via an access link), and the configuration message may indicate the mapping to be used by the Tx UE 505. Additionally, or alternatively, the Tx UE 505 may receive the mapping from another UE 120 (e.g., a UE 120 that controls sidelink communications or an initiator UE 120). In some aspects, multiple mappings may be specified in a wireless communication standard, and the UE 120 may receive an index value from another device (e.g., a base station 110 or a UE 120) to indicate which of the multiple mappings to use. In this example, different index values may correspond to different mappings (e.g., different tables of bandwidths and corresponding durations). In some aspects, the mapping may be determined by the Tx UE 505 without being specified in a wireless communication standard or configured by another device. In this case, the Tx UE 505 may always signal the bandwidth and/or the duration of the sidelink PRS.

As shown by reference number 540, the Rx UE 510 may determine (e.g., using communication manager 140, determination component 1008, and/or controller/processor 280) a bandwidth and/or a duration used for the transmission of the sidelink PRS. In some aspects, the Rx UE 510 may determine a bandwidth used for the transmission of the sidelink PRS and may determine the duration based at least in part on the bandwidth. Additionally, or alternatively, the Rx UE 510 may directly determine the duration (e.g., without deriving the duration from the bandwidth), such as when the duration is indicated to the Rx UE 510 (e.g., in a signaling message from the Tx UE 505). As another example, the Rx UE 510 may determine a duration used for the transmission of the sidelink PRS and may determine the bandwidth based at least in part on the duration. Additionally, or alternatively, the Rx UE 510 may directly determine the bandwidth (e.g., without deriving the bandwidth from the duration), such as when the bandwidth is indicated to the Rx UE 510 (e.g., in a signaling message from the Tx UE 505).

In some aspects, the Rx UE 510 may determine the bandwidth and/or the duration based at least in part on a sidelink control signal received by the Rx UE 510. In some aspects, the Tx UE 505 may transmit a sidelink control signal in association with the sidelink PRS. The sidelink control signal may indicate the bandwidth and/or the duration used for transmission of the sidelink PRS. In some aspects, the Rx UE 510 may determine both the bandwidth and the duration according to an explicit indication of the bandwidth and the duration in the sidelink control signal (e.g., using two fields of the sidelink control signal, one for each of the bandwidth and the duration). Alternatively, the sidelink control signal may explicitly indicate only one of the bandwidth or the duration (e.g., in a field of the sidelink control signal), and the Rx UE 510 may derive the other of the bandwidth or the duration using whichever one is signaled (e.g., according to a mapping, as described elsewhere herein). Additionally, or alternatively, the Rx UE 510 may determine the bandwidth and/or the duration based at least in part on one or more transmission parameters associated with the sidelink PRS, as described in more detail in connection with FIG. 6.

In some aspects, if the Rx UE 510 determines only one of the bandwidth or the duration (such as by identifying the sidelink PRS by monitoring one or more channels), or is signaled only one of the bandwidth or the duration, then the Rx UE 510 may determine the other one of the bandwidth or the duration based at least in part on a mapping between a set of bandwidths and a corresponding set of durations, as described elsewhere herein. The Rx UE 510 may determine the mapping in any of the ways described above in connection with the Tx UE 505. For example, the mapping may be stored, hard-coded, pre-configured, and/or programmed in memory of the Rx UE 510 (e.g., when the Rx UE 510 is manufactured). Additionally, or alternatively, the Rx UE 510 may receive a signaling message that indicates the mapping, such as from a base station 110 (e.g., in a configuration message, such as an RRC configuration message or an RRC reconfiguration message) and/or from another UE 120 (e.g., the Tx UE 505, a UE 120 that controls sidelink communications, and/or an initiator UE 120 for a group of UEs that are grouped together for sidelink PRS transmissions).

As shown by reference number 545, the Rx UE 510 may measure (e.g., using communication manager 140, measurement component 1010, and/or controller/processor 280) the sidelink PRS. For example, the Rx UE 510 may measure the sidelink PRS based at least in part on the bandwidth and/or the duration. For example, based at least in part on determining the bandwidth, the Rx UE 510 may measure the sidelink PRS in the determined bandwidth. Additionally, or alternatively, based at least in part on determining the duration of the sidelink PRS, the Rx UE 510 may measure the sidelink PRS in the determined duration (e.g., starting at a starting symbol, which may be determined by the Rx UE 510 according to a sidelink control signal or based at least in part on monitoring or scanning one or more channels for the sidelink PRS). The Rx UE 510 may use the sidelink PRS measurement to determine a position (e.g., a relative position or an absolute position) of the Tx UE 505, such as by determining one or more timing measurements and/or one or more angle measurements.

As shown by reference number 550, in some aspects, the Rx UE 510 may transmit (e.g., using communication manager 140, transmission component 1004, and/or controller/processor 280), to the Tx UE 505, a subsequent sidelink PRS (e.g., subsequent to the sidelink PRS transmitted by the Tx UE 505) based at least in part on receiving and/or measuring the sidelink PRS from the Tx UE 505. For example, some positioning techniques include transmissions by both a transmitter and a receiver (e.g., to determine a relative position), such as for a determination of RTT. In this example, a resource location, a bandwidth, and/or a duration of the subsequent sidelink PRS may be based at least in part on a resource location, bandwidth, and/or duration of the sidelink PRS received from the Tx UE 505.

For example, as shown by reference number 555, the Rx UE 510 may transmit (e.g., using communication manager 140, transmission component 1004, and/or controller/processor 280) the subsequent sidelink PRS (shown as "Rx UE PRS") in a same set of (e.g., one or more) frequency domain resources (e.g., channels) as the sidelink PRS received from the Tx UE 505 (shown as "Tx UE PRS"). This may be particularly useful if the Tx UE 505 has reserved those frequency domain resource(s), such as for channel occupancy time (COT) reservation. In this case, because the channel(s) are reserved, the Rx UE 510 may not need to perform a channel access procedure to access the channel(s), thus reducing delays associated with transmission, measurement, and positioning determination. As another example, the Rx UE 510 may transmit the subsequent sidelink PRS starting in a time domain resource that occurs after a final (e.g., latest-occurring) time domain resource that carries the sidelink PRS transmitted by the Tx UE 505. In some aspects, the starting symbol of the subsequent sidelink PRS may be separated from the final symbol of the sidelink PRS transmitted by the Tx UE 505 by a gap (e.g., a threshold number of symbols). The gap may be stored in memory of the Rx UE 510 (e.g., according to a wireless communication standard), and/or may be signaled to the Rx UE 510 (e.g., by the Tx UE 505 and/or by a base station 110).

Additionally, or alternatively, the bandwidth used by the Rx UE 510 to transmit the subsequent sidelink PRS may be the same as the bandwidth used by the Tx UE 505 to transmit the sidelink PRS. Additionally, or alternatively, the duration used by the Rx UE 510 to transmit the subsequent sidelink PRS may be the same as the duration used by the Tx UE 505 to transmit the sidelink PRS. This may enable improved accuracy of positioning determination and flexible signaling of the sidelink PRS according to an available bandwidth, as described elsewhere herein.

As indicated above, FIG. 5 is provided as an example. Other examples may differ from what is described with respect to FIG. 5.

Figure 6:
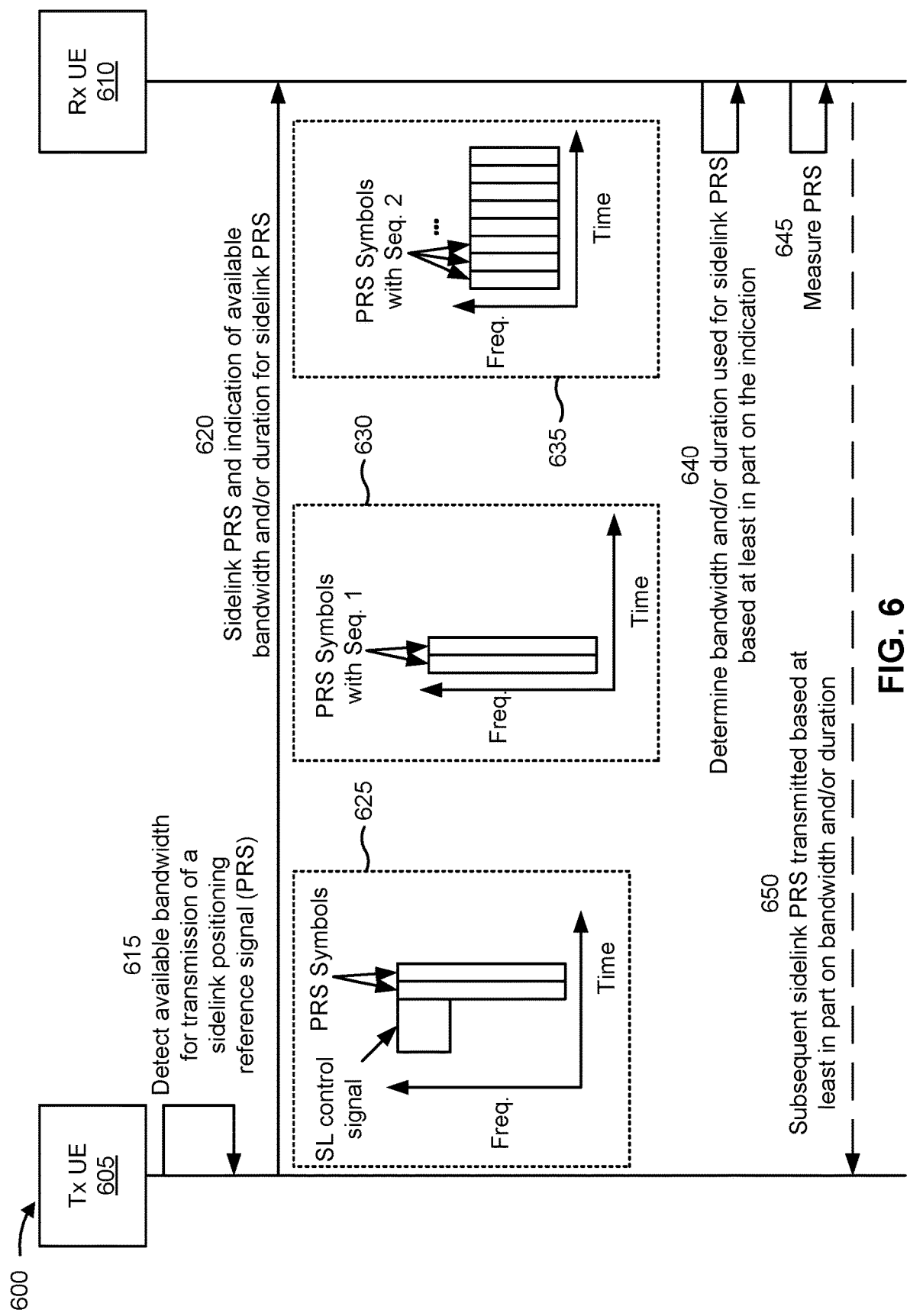

FIG. 6 is a diagram illustrating an example 600 associated with sidelink positioning reference signal transmission and reception, in accordance with the present disclosure. As shown in FIG. 6, a Tx UE 605 and a Rx UE 610 may communicate with one another.

As shown by reference number 615, the Tx UE 505 may detect (e.g., using communication manager 140, detection component 908, and/or controller/processor 280) an available bandwidth for transmission of a sidelink PRS, as described above in connection with reference number 515 of FIG. 5. The Tx UE 505 may determine a duration for the sidelink PRS based at least in part on the available bandwidth, as described above in connection with FIG. 5.

As shown by reference number 620, the Tx UE 505 may transmit (e.g., using communication manager 140, transmission component 904, and/or controller/processor 280) an indication of the available bandwidth and/or the duration. In some aspects, the Tx UE 505 may transmit the indication in connection with the sidelink PRS. For example, as shown by reference number 625, the Tx UE 505 may explicitly indicate (e.g., using one or more fields that indicates a corresponding one or more values of) the bandwidth and/or the duration, such as in a sidelink control signal. In some aspects, a resource location of the sidelink control signal may depend on a resource location of the PRS. For example, the sidelink control signal may be transmitted using the same frequency domain resources as the sidelink PRS or in a subset of the frequency domain resources used for transmission of the sidelink PRS. Explicitly indicating the bandwidth and/or the duration may conserve processing resources that would otherwise be used by the Tx UE 605 and/or the Rx UE 610 to transmit and/or receive (e.g., using hypothesis testing) the sidelink PRS using a transmission parameter that implicitly indicates the bandwidth and/or the duration.

In FIG. 6, the sidelink control signal is shown as sharing an upper channel (e.g., a highest frequency channel) as the sidelink PRS, but may share a lower channel (e.g., a lowest frequency channel) with the sidelink PRS in some aspects, or may be transmitted using a middle channel or set of channels of the sidelink PRS. Additionally, or alternatively, the sidelink control signal may be transmitted in a time domain resource (e.g., one or more symbols) that immediately precede the sidelink PRS, as shown in FIG. 6. In some aspects, the Tx UE 505 may transmit the sidelink control signal upon success of a channel access procedure (e.g., in a threshold number of channels, in some aspects).

In some aspects, the Tx UE 505 may implicitly indicate the bandwidth and/or the duration, such as by using one or more transmission parameters of the sidelink PRS. For example, the Tx UE 505 may select or determine a sequence used for transmission of the PRS (e.g., a reference signal sequence, a Gold sequence, a low peak-to-average power ratio (PAPR) sequence, or the like) based at least in part on the bandwidth and/or the duration. In such an example, the one or more transmission parameters may include a sequence used for transmission of the sidelink PRS, a seed of the sequence used for transmission of the sidelink PRS (e.g., a seed of a Gold sequence), and/or a sequence index of the sequence used for transmission of the sidelink PRS (e.g., a sequence index of a low PAPR sequence). As an example, and as shown by reference number 630, the sidelink PRS may include or be transmitted using a first sequence (shown as "Seq. 1") for a first bandwidth (e.g., 80 MHz). Similarly, as shown by reference number 635, the sidelink PRS may include or be transmitted using a second sequence (shown as "Seq. 2") for a second bandwidth (e.g., 20 MHz). In some aspects, the number of sequences used for transmission of the sidelink PRS may depend on a number of possible bandwidths, such as a minimum and/or maximum number of channels in which a sidelink PRS can be transmitted. Implicitly indicating the bandwidth and/or the duration may conserve network resources that would otherwise be used to transmit a sidelink control signal that explicitly indicates the bandwidth and/or the duration.

In some aspects, the Tx UE 505 need not signal the bandwidth and/or the duration, or may only need to signal one of the bandwidth or the duration, which conserves processing resources of the Tx UE 505 and conserves network resources that would otherwise be used to signal the bandwidth and/or the duration. For example, if the mapping between bandwidths and durations is specified according to a wireless communication standard or indicated to all UEs 120, then the Tx UE 505 need not indicate the bandwidth and/or the duration because the Rx UE 510 can determine the bandwidth by scanning the unlicensed RF spectrum and can determine the duration using the bandwidth and the mapping. Alternatively, the Tx UE 505 may indicate only the bandwidth, and the Rx UE 510 may determine the duration using the bandwidth and the mapping.

As shown by reference number 640, the Rx UE 610 may determine (e.g., using communication manager 140, determination component 1008, and/or controller/processor 280) a bandwidth and/or a duration used for the transmission of the sidelink PRS, as described above in connection with reference number 540 of FIG. 5. For example, the Rx UE 610 may monitor for and/or detect the sidelink control signal, and may determine the bandwidth and/or the duration based at least in part on the sidelink control signal, as described above in connection with FIG. 5. In some aspects, the sidelink control signal has a predetermined bandwidth, which may be specified in a wireless communication standard. For example, the sidelink control signal may occupy a single channel, and the Rx UE 610 may attempt to decode a sidelink control signal in each of the channels being monitored by the Rx UE 610 until the sidelink control signal is successfully decoded. In some aspects, the bandwidth of the sidelink control signal may be stored, hard-coded, and/or programmed in memory of the Rx UE 610 and the Tx UE 505 (e.g., at a time of manufacture). Additionally, or alternatively, a bandwidth of the sidelink control signal may be signaled to the Rx UE 610 by the base station 110 (e.g., in a configuration message) and/or by another UE (e.g., the Tx UE 605, a UE 120 that controls sidelink communications, or an initiator UE 120). In some aspects, the Rx UE 610 may monitor a set of channels for the sidelink control signal (e.g., a set of channels in the unlicensed RF spectrum).

Additionally, or alternatively, the Rx UE 610 may determine the bandwidth and/or the duration based at least in part on one or more transmission parameters associated with the sidelink PRS, such as a sequence used for transmission of the sidelink PRS, a seed of the sequence used for transmission of the sidelink PRS, and/or a sequence index of the sequence used for transmission of the sidelink PRS. In this example, the Rx UE 610 may test multiple reception hypotheses when attempting to measure the sidelink PRS, such as a first hypothesis using a first sequence, a second hypothesis using a second sequence, and so on. When the Rx UE 610 successfully receives the sidelink PRS, the Rx UE 610 may use the sequence used for the successful reception to determine the bandwidth and/or the duration. For example, different sequences may map to different bandwidths and/or durations. A mapping between sequences and corresponding bandwidths and/or durations may be hard-coded in memory of the Rx UE 610 and the Tx UE 605, may be signaled by the base station 110 (e.g., in a configuration message), and/or may be signaled by another UE 120, in a similar manner as described elsewhere herein for other mappings.

As shown by reference number 645, the Rx UE 610 may measure (e.g., using communication manager 140, measurement component 1010, and/or controller/processor 280) the sidelink PRS, as described above in connection with reference number 545 of FIG. 5. As shown by reference number 650, in some aspects, the Rx UE 610 may transmit (e.g., using communication manager 140, transmission component 1004, and/or controller/processor 280), to the Tx UE 605, a subsequent sidelink PRS based at least in part on receiving and/or measuring the sidelink PRS from the Tx UE 605, as described above in connection with reference number 550 of FIG. 5.

Using the techniques and apparatuses described herein enables flexible transmission of sidelink PRS to improve accuracy of position determinations. Furthermore, some techniques and apparatuses described herein enable indications and signaling associated with sidelink PRS to improve reception of sidelink PRS, resulting in more accurate position determinations. Although some aspects are described herein as determining a duration for a sidelink PRS based at least in part on an available bandwidth for transmission of the sidelink PRS, these aspects may be applied to other types of communications other than sidelink PRS. For example, aspects described herein may be used to determine a duration for transmission of another type of sidelink reference signal (e.g., other than a sidelink PRS), a duration for transmission of sidelink control information (e.g., on the PSCCH), and/or a duration for transmission of sidelink data (e.g., on the PSSCH).

As indicated above, FIG. 6 is provided as an example. Other examples may differ from what is described with respect to FIG. 6.

Figure 7:
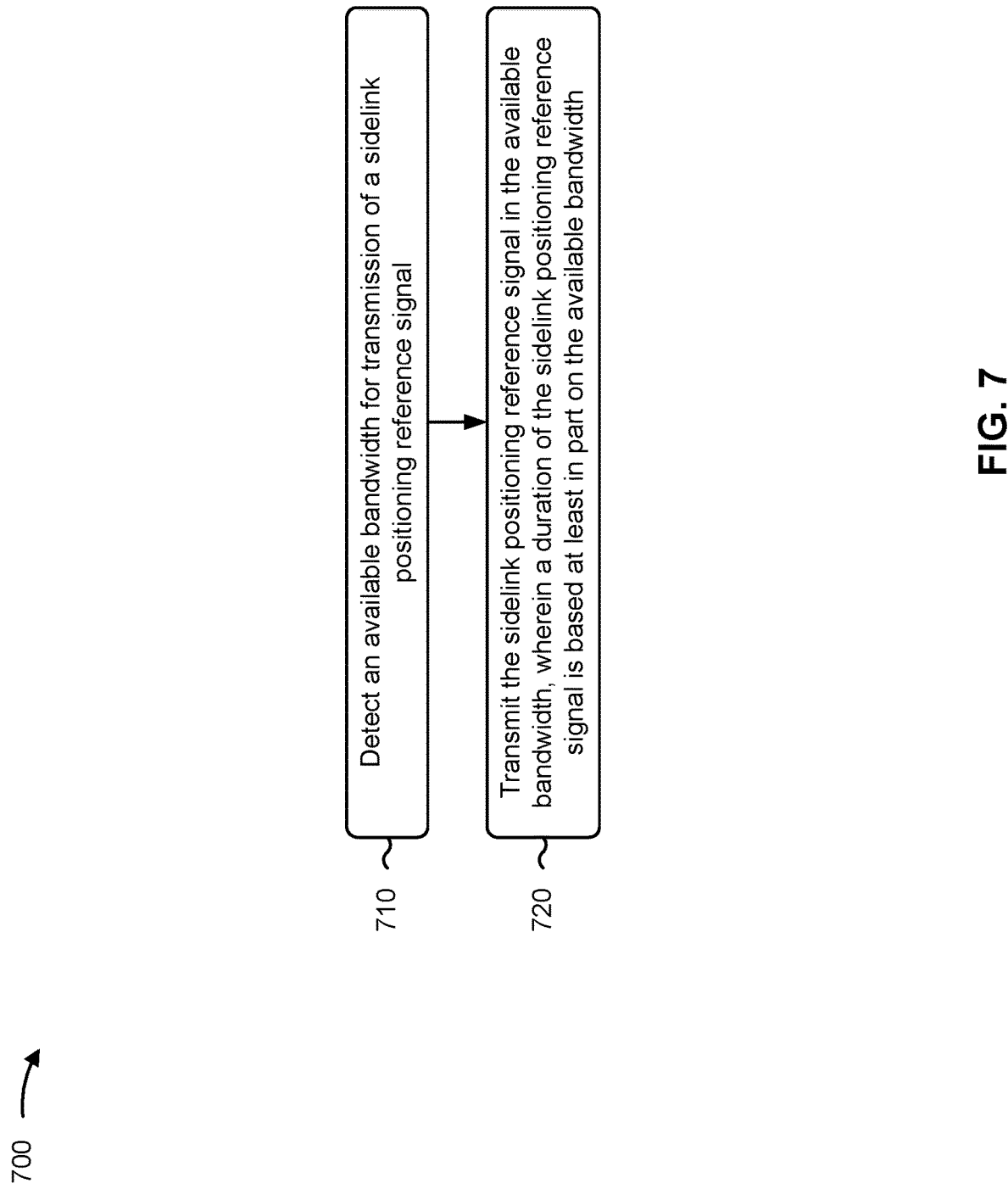
FIG. 7 is a diagram illustrating an example process associated with sidelink positioning reference signal transmission, in accordance with the present disclosure.

FIG. 7 is a diagram illustrating an example process 700 performed, for example, by a transmitter UE, in accordance with the present disclosure. Example process 700 is an example where the transmitter UE (e.g., transmitter UE 505, transmitter UE 605, and/or UE 120) performs operations associated with sidelink PRS transmission.

As shown in FIG. 7, in some aspects, process 700 may include detecting an available bandwidth for transmission of a sidelink positioning reference signal (block 710). For example, the transmitter UE (e.g., using communication manager 140, reception component 902, and/or detection component 908, depicted in FIG. 9) may detect an available bandwidth for transmission of a sidelink positioning reference signal, as described above in connection with, for example, reference number 515 of FIG. 5 and/or reference number 615 of FIG. 6.

As further shown in FIG. 7, in some aspects, process 700 may include transmitting the sidelink positioning reference signal in the available bandwidth, wherein a duration of the sidelink positioning reference signal is based at least in part on the available bandwidth (block 720). For example, the transmitter UE (e.g., using communication manager 140 and/or transmission component 904, depicted in FIG. 9) may transmit the sidelink positioning reference signal in the available bandwidth, wherein a duration of the sidelink positioning reference signal is based at least in part on the available bandwidth, as described above in connection with, for example, reference number 520 of FIG. 5 and/or reference number 620 of FIG. 6.

Process 700 may include additional aspects, such as any single aspect or any combination of aspects described below and/or in connection with one or more other processes described elsewhere herein.

In a first aspect, the duration of the sidelink positioning reference signal is shorter when the available bandwidth is larger, and wherein the duration of the sidelink positioning reference signal is longer when the available bandwidth is smaller. In a second aspect, alone or in combination with the first aspect, the available bandwidth is detected based at least in part on performing a channel access procedure in an unlicensed radio frequency spectrum band. In a third aspect, alone or in combination with one or more of the first and second aspects, the duration of the sidelink positioning reference signal is determined based at least in part on a mapping between a set of bandwidths and a corresponding set of durations, wherein information that indicates the mapping is stored by the transmitter UE.

In a fourth aspect, alone or in combination with one or more of the first through third aspects, the duration of the sidelink positioning reference signal is determined based at least in part on a mapping between a set of bandwidths and a corresponding set of durations, wherein the mapping is indicated in a message received by the transmitter UE. In a fifth aspect, alone or in combination with one or more of the first through fourth aspects, process 700 includes transmitting an indication of at least one of the available bandwidth or the duration. In a sixth aspect, alone or in combination with one or more of the first through fifth aspects, the indication is transmitted in a sidelink control signal upon success of a channel access procedure.

In a seventh aspect, alone or in combination with one or more of the first through sixth aspects, the indication is indicated using one or more transmission parameters of the sidelink positioning reference signal. In an eighth aspect, alone or in combination with one or more of the first through seventh aspects, the one or more transmission parameters include at least one of a sequence used for transmission of the sidelink positioning reference signal, a seed of the sequence used for transmission of the sidelink positioning reference signal, or a sequence index of the sequence used for transmission of the sidelink positioning reference signal.

In a ninth aspect, alone or in combination with one or more of the first through eighth aspects, process 700 includes performing a channel access procedure in a set of channels until the channel access procedure succeeds in a number of channels that satisfies a threshold, wherein the available bandwidth is a bandwidth of the number of channels, and wherein transmitting the sidelink positioning reference signal in the available bandwidth comprises transmitting the sidelink positioning reference signal in the number of channels, wherein the duration is based at least in part on the bandwidth of the number of channels.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
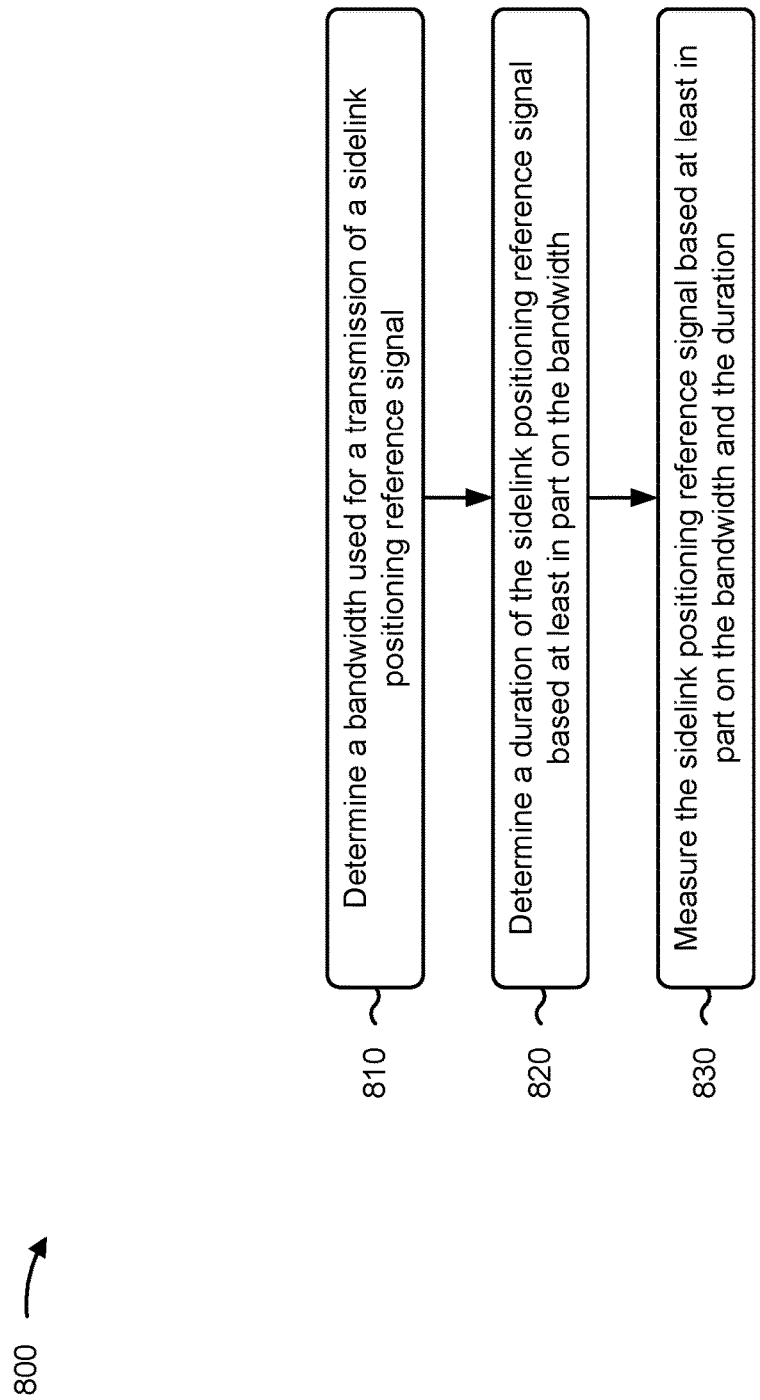
FIG. 8 is a diagram illustrating an example process associated with sidelink positioning reference signal reception, in accordance with the present disclosure.

FIG. 8 is a diagram illustrating an example process 800 performed, for example, by a receiver UE, in accordance with the present disclosure. Example process 800 is an example where the receiver UE (e.g., receiver UE 510, receiver UE 610, and/or UE 120) performs operations associated with sidelink positioning reference signal reception.

As shown in FIG. 8, in some aspects, process 800 may include determining a bandwidth used for a transmission of a sidelink positioning reference signal (block 810). For example, the receiver UE (e.g., using communication manager 140 and/or determination component 1008, depicted in FIG. 10) may determine a bandwidth used for a transmission of a sidelink positioning reference signal, as described above in connection with, for example, reference number 540 of FIG. 5 and/or reference number 640 of FIG. 6.

As further shown in FIG. 8, in some aspects, process 800 may include determining a duration of the sidelink positioning reference signal based at least in part on the bandwidth (block 820). For example, the receiver UE (e.g., using communication manager 140 and/or determination component 1008, depicted in FIG. 10) may determine a duration of the sidelink positioning reference signal based at least in part on the bandwidth, as described above in connection with, for example, reference number 540 of FIG. 5 and/or reference number 640 of FIG. 6.

As further shown in FIG. 8, in some aspects, process 800 may include measuring the sidelink positioning reference signal based at least in part on the bandwidth and the duration (block 830). For example, the receiver UE (e.g., using communication manager 140 and/or measurement component 1010, depicted in FIG. 10) may measure the sidelink positioning reference signal based at least in part on the bandwidth and the duration, as described above in connection with, for example, reference number 545 of FIG. 5 and/or reference number 645 of FIG. 6.

Process 800 may include additional aspects, such as any single aspect or any combination of aspects described below and/or in connection with one or more other processes described elsewhere herein.

In a first aspect, the bandwidth used for the transmission of the sidelink positioning reference signal is determined based at least in part on a sidelink control signal received by the receiver UE. In a second aspect, alone or in combination with the first aspect, the sidelink control signal has a predetermined bandwidth and the sidelink control signal is received based at least in part on monitoring a set of channels for the sidelink control signal. In a third aspect, alone or in combination with one or more of the first and second aspects, the bandwidth used for the transmission of the sidelink positioning reference signal is determined based at least in part on one or more transmission parameters associated with the sidelink positioning reference signal.

In a fourth aspect, alone or in combination with one or more of the first through third aspects, the one or more transmission parameters include at least one of a sequence used for transmission of the sidelink positioning reference signal, a seed of the sequence used for transmission of the sidelink positioning reference signal, or a sequence index of the sequence used for transmission of the sidelink positioning reference signal. In a fifth aspect, alone or in combination with one or more of the first through fourth aspects, process 800 includes transmitting a subsequent sidelink positioning reference signal, wherein at least one of a resource location, a bandwidth, or a duration of the subsequent sidelink positioning reference signal is based at least in part on at least one of the bandwidth or the duration of the sidelink positioning reference signal measured by the receiver UE. In a sixth aspect, alone or in combination with one or more of the first through fifth aspects, the duration of the sidelink positioning reference signal is determined based at least in part on a mapping between a set of bandwidths and a corresponding set of durations.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
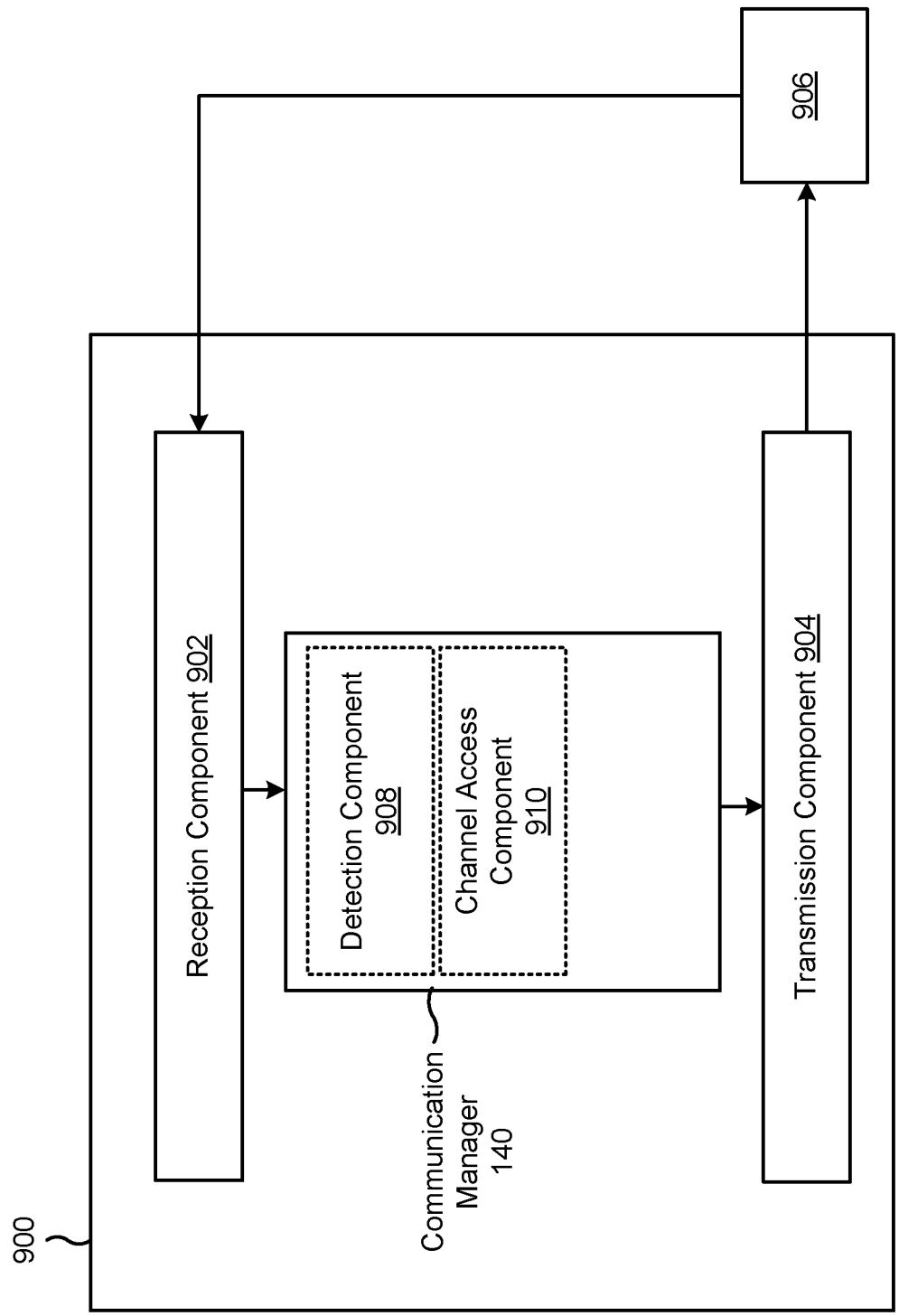
FIGS. 9 and 10 are diagrams of example apparatuses for wireless communication, in accordance with the present disclosure.

FIG. 9 is a diagram of an example apparatus 900 for wireless communication. The apparatus 900 may be a UE (e.g., a transmitter UE), or a UE may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include the communication manager 140. The communication manager 140 may include one or more of a detection component 908 or a channel access component 910, among other examples.

In some aspects, the apparatus 900 may be configured to perform one or more operations described herein in connection with FIGS. 5-6. Additionally, or alternatively, the apparatus 900 may be configured to perform one or more processes described herein, such as process 700 of FIG. 7. In some aspects, the apparatus 900 and/or one or more components shown in FIG. 9 may include one or more components of the UE described in connection with FIG. 2. Additionally, or alternatively, one or more components shown in FIG. 9 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 906. In some aspects, the reception component 902 may include one or more antennas, a modem, a demodulator, a MIMO detector, a receive processor, a controller/processor, a memory, or a combination thereof, of the UE described in connection with FIG. 2.

The transmission component 904 may transmit communications, such as reference signals, control information, data communications, or a combination thereof, to the apparatus 906. In some aspects, one or more other components of the apparatus 906 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modem, a modulator, a transmit MIMO processor, a transmit processor, a controller/processor, a memory, or a combination thereof, of the UE described in connection with FIG. 2. In some aspects, the transmission component 904 may be co-located with the reception component 902 in a transceiver.

The detection component 908 or the reception component 902 may detect an available bandwidth for transmission of a sidelink positioning reference signal. The transmission component 904 may transmit the sidelink positioning reference signal in the available bandwidth, wherein a duration of the sidelink positioning reference signal is based at least in part on the available bandwidth. In some aspects, the transmission component 904 may transmit an indication of at least one of the available bandwidth or the duration. In some aspects, the channel access component 910 may perform a channel access procedure in a set of channels until the channel access procedure succeeds in a number of channels that satisfies a threshold, wherein the available bandwidth is a bandwidth of the number of channels.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

Figure 10:
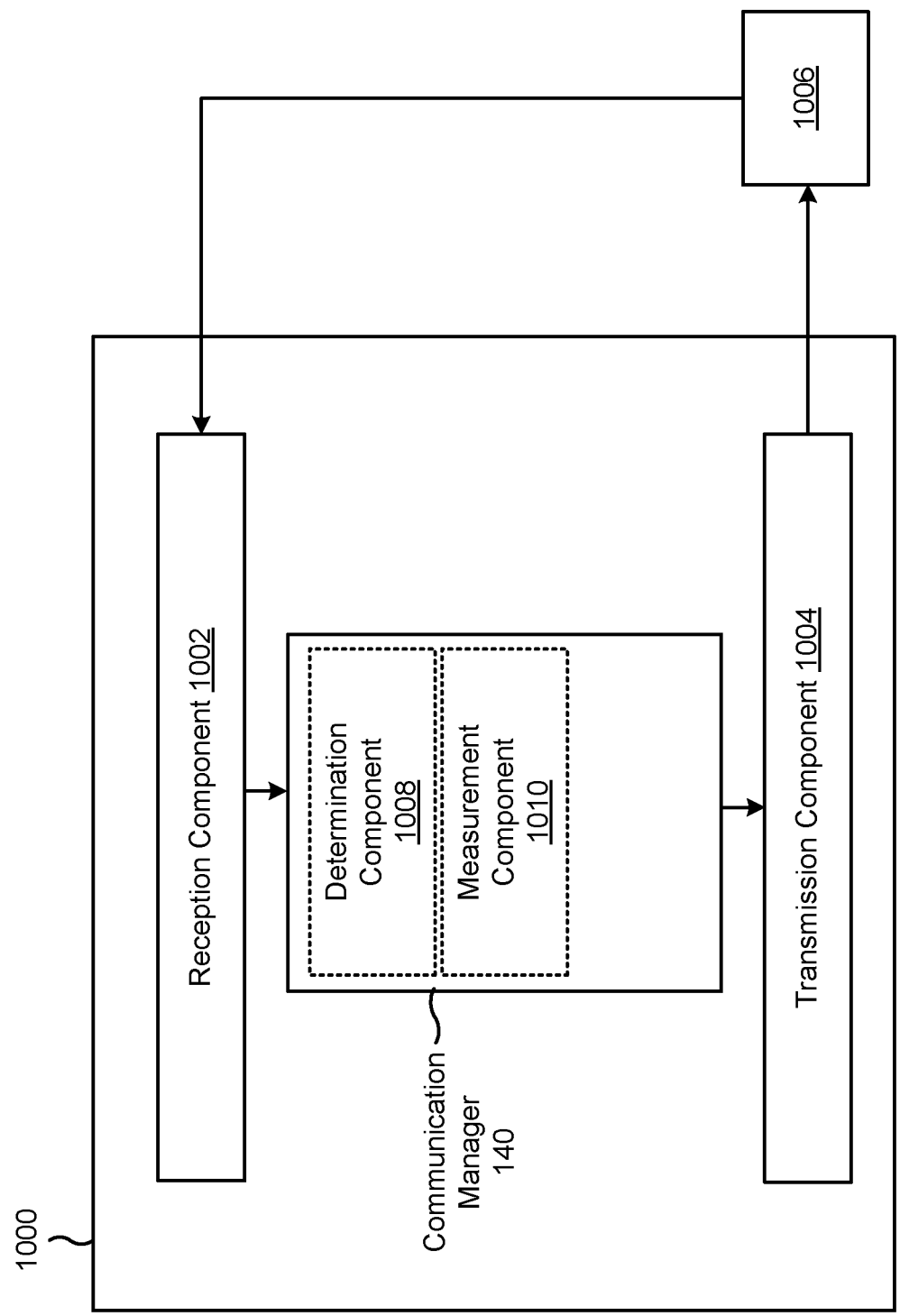

FIG. 10 is a diagram of an example apparatus 1000 for wireless communication. The apparatus 1000 may be a UE (e.g., a receiver UE), or a UE may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include the communication manager 140. The communication manager 140 may include one or more of a determination component 1008 or a measurement component 1010, among other examples.

In some aspects, the apparatus 1000 may be configured to perform one or more operations described herein in connection with FIGS. 5-6. Additionally, or alternatively, the apparatus 1000 may be configured to perform one or more processes described herein, such as process 800 of FIG. 8. In some aspects, the apparatus 1000 and/or one or more components shown in FIG. 10 may include one or more components of the UE described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1006. In some aspects, the reception component 1002 may include one or more antennas, a modem, a demodulator, a MIMO detector, a receive processor, a controller/processor, a memory, or a combination thereof, of the UE described in connection with FIG. 2.

The transmission component 1004 may transmit communications, such as reference signals, control information, data communications, or a combination thereof, to the apparatus 1006. In some aspects, one or more other components of the apparatus 1006 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modem, a modulator, a transmit MIMO processor, a transmit processor, a controller/processor, a memory, or a combination thereof, of the UE described in connection with FIG. 2. In some aspects, the transmission component 1004 may be co-located with the reception component 1002 in a transceiver.

The determination component 1008 may determine a bandwidth used for a transmission of a sidelink positioning reference signal. The determination component 1008 may determine a duration of the sidelink positioning reference signal based at least in part on the bandwidth. The measurement component 1010 may measure the sidelink positioning reference signal based at least in part on the bandwidth and the duration. The transmission component 1004 may transmit a subsequent sidelink positioning reference signal, wherein at least one of a resource location, a bandwidth, or a duration of the subsequent sidelink positioning reference signal is based at least in part on at least one of the bandwidth or the duration of the sidelink positioning reference signal measured by the receiver UE.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

The following provides an overview of some Aspects of the present disclosure:

Aspect 1: A method of wireless communication performed by a transmitter user equipment (UE), comprising: detecting an available bandwidth for transmission of a sidelink positioning reference signal; and transmitting the sidelink positioning reference signal in the available bandwidth, wherein a duration of the sidelink positioning reference signal is based at least in part on the available bandwidth.

Aspect 2: The method of Aspect 1, wherein the duration of the sidelink positioning reference signal is shorter when the available bandwidth is larger, and wherein the duration of the sidelink positioning reference signal is longer when the available bandwidth is smaller.

Aspect 3: The method of any of Aspects 1-2, wherein the available bandwidth is detected based at least in part on performing a channel access procedure in an unlicensed radio frequency spectrum band.

Aspect 4: The method of any of Aspects 1-3, wherein the duration of the sidelink positioning reference signal is determined based at least in part on a mapping between a set of bandwidths and a corresponding set of durations, wherein information that indicates the mapping is stored by the transmitter UE.

Aspect 5: The method of any of Aspects 1-3, wherein the duration of the sidelink positioning reference signal is determined based at least in part on a mapping between a set of bandwidths and a corresponding set of durations, wherein the mapping is indicated in a message received by the transmitter UE.

Aspect 6: The method of any of Aspects 1-5, further comprising transmitting an indication of at least one of the available bandwidth or the duration.

Aspect 7: The method of Aspect 6, wherein the indication is transmitted in a sidelink control signal upon success of a channel access procedure.

Aspect 8: The method of Aspect 6, wherein the indication is indicated using one or more transmission parameters of the sidelink positioning reference signal.

Aspect 9: The method of Aspect 8, wherein the one or more transmission parameters include at least one of a sequence used for transmission of the sidelink positioning reference signal, a seed of the sequence used for transmission of the sidelink positioning reference signal, or a sequence index of the sequence used for transmission of the sidelink positioning reference signal.

Aspect 10: The method of any of Aspects 1-9, further comprising: performing a channel access procedure in a set of channels until the channel access procedure succeeds in a number of channels that satisfies a threshold, wherein the available bandwidth is a bandwidth of the number of channels; and wherein transmitting the sidelink positioning reference signal in the available bandwidth comprises transmitting the sidelink positioning reference signal in the number of channels, wherein the duration is based at least in part on the bandwidth of the number of channels. wherein transmitting the sidelink positioning reference signal in the available bandwidth comprises transmitting the sidelink positioning reference signal in the number of channels, wherein the duration is based at least in part on the bandwidth of the number of channels.

Aspect 11: A method of wireless communication performed by a receiver user equipment (UE), comprising: determining a bandwidth used for a transmission of a sidelink positioning reference signal; and determining a duration of the sidelink positioning reference signal based at least in part on the bandwidth; and measuring the sidelink positioning reference signal based at least in part on the bandwidth and the duration.

Aspect 12: The method of Aspect 11, wherein the bandwidth used for the transmission of the sidelink positioning reference signal is determined based at least in part on a sidelink control signal received by the receiver UE.

Aspect 13: The method of Aspect 12, wherein the sidelink control signal has a predetermined bandwidth and the sidelink control signal is received based at least in part on monitoring a set of channels for the sidelink control signal.

Aspect 14: The method of Aspect 11, wherein the bandwidth used for the transmission of the sidelink positioning reference signal is determined based at least in part on one or more transmission parameters associated with the sidelink positioning reference signal.

Aspect 15: The method of Aspect 14, wherein the one or more transmission parameters include at least one of a sequence used for transmission of the sidelink positioning reference signal, a seed of the sequence used for transmission of the sidelink positioning reference signal, or a sequence index of the sequence used for transmission of the sidelink positioning reference signal.

Aspect 16: The method of any of Aspects 11-15, further comprising transmitting a subsequent sidelink positioning reference signal, wherein at least one of a resource location, a bandwidth, or a duration of the subsequent sidelink positioning reference signal is based at least in part on at least one of the bandwidth or the duration of the sidelink positioning reference signal measured by the receiver UE.

Aspect 17: The method of any of Aspects 11-16, wherein the duration of the sidelink positioning reference signal is determined based at least in part on a mapping between a set of bandwidths and a corresponding set of durations.

Aspect 18: An apparatus for wireless communication at a device, comprising a processor; memory coupled with the processor; and instructions stored in the memory and executable by the processor to cause the apparatus to perform the method of one or more of Aspects 1-10.

Aspect 19: A device for wireless communication, comprising a memory and one or more processors coupled to the memory, the one or more processors configured to perform the method of one or more of Aspects 1-10.

Aspect 20: An apparatus for wireless communication, comprising at least one means for performing the method of one or more of Aspects 1-10.

Aspect 21: A non-transitory computer-readable medium storing code for wireless communication, the code comprising instructions executable by a processor to perform the method of one or more of Aspects 1-10.

Aspect 22: A non-transitory computer-readable medium storing a set of instructions for wireless communication, the set of instructions comprising one or more instructions that, when executed by one or more processors of a device, cause the device to perform the method of one or more of Aspects 1-10.

Aspect 23: An apparatus for wireless communication at a device, comprising a processor; memory coupled with the processor; and instructions stored in the memory and executable by the processor to cause the apparatus to perform the method of one or more of Aspects 11-17.

Aspect 24: A device for wireless communication, comprising a memory and one or more processors coupled to the memory, the one or more processors configured to perform the method of one or more of Aspects 11-17.

Aspect 25: An apparatus for wireless communication, comprising at least one means for performing the method of one or more of Aspects 11-17.

Aspect 26: A non-transitory computer-readable medium storing code for wireless communication, the code comprising instructions executable by a processor to perform the method of one or more of Aspects 11-17.

Aspect 27: A non-transitory computer-readable medium storing a set of instructions for wireless communication, the set of instructions comprising one or more instructions that, when executed by one or more processors of a device, cause the device to perform the method of one or more of Aspects 11-17.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a +b, a +c, b +c, and a +b +c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a transmitter user equipment (UE), comprising:
    performing a channel access procedure in a set of channels until the channel access procedure succeeds in a number of channels that satisfies a threshold;
    detecting an available bandwidth, based at least in part on the channel access procedure, for transmission of a sidelink positioning reference signal, wherein the available bandwidth is a bandwidth of the number of channels; and
    transmitting the sidelink positioning reference signal in the available bandwidth based at least in part on the bandwidth of the number of channels, wherein a duration of the sidelink positioning reference signal is based at least in part on the available bandwidth.

2. The method of claim 1, wherein the duration of the sidelink positioning reference signal is shorter when the available bandwidth is larger, and wherein the duration of the sidelink positioning reference signal is longer when the available bandwidth is smaller.

3. The method of claim 1, wherein the available bandwidth in the set of contiguous channels is detected based at least in part on performing the channel access procedure in the set of channels in an unlicensed radio frequency spectrum band.

4. The method of claim 1, wherein the duration of the sidelink positioning reference signal is determined based at least in part on a mapping between a set of bandwidths and a corresponding set of durations, wherein information that indicates the mapping is stored by the transmitter UE.

5. The method of claim 1, wherein the duration of the sidelink positioning reference signal is determined based at least in part on a mapping between a set of bandwidths and a corresponding set of durations, wherein the mapping is indicated in a message received by the transmitter UE.

6. The method of claim 1, further comprising transmitting an indication of at least one of the available bandwidth or the duration.

7. The method of claim 6, wherein the indication is transmitted in a sidelink control signal upon success of a channel access procedure.

8. The method of claim 6, wherein the indication is indicated using one or more transmission parameters of the sidelink positioning reference signal.

9. The method of claim 8, wherein the one or more transmission parameters include at least one of a sequence used for transmission of the sidelink positioning reference signal, a seed of the sequence used for transmission of the sidelink positioning reference signal, or a sequence index of the sequence used for transmission of the sidelink positioning reference signal.

10. A method of wireless communication performed by a receiver user equipment (UE), comprising:
    determining a bandwidth used for a transmission of a sidelink positioning reference signal, wherein the bandwidth is based at least in part on a number of channels used for the transmission of the sidelink positioning reference signal;
    determining a duration of the sidelink positioning reference signal based at least in part on the bandwidth; and
    measuring the sidelink positioning reference signal based at least in part on the bandwidth and the duration.

11. The method of claim 10, wherein the bandwidth used for the transmission of the sidelink positioning reference signal is determined based at least in part on a sidelink control signal received by the receiver UE.

12. The method of claim 11, wherein the sidelink control signal has a predetermined bandwidth and the sidelink control signal is received based at least in part on monitoring a set of channels for the sidelink control signal.

13. The method of claim 10, wherein the bandwidth used for the transmission of the sidelink positioning reference signal is determined based at least in part on one or more transmission parameters associated with the sidelink positioning reference signal.

14. The method of claim 13, wherein the one or more transmission parameters include at least one of a sequence used for transmission of the sidelink positioning reference signal, a seed of the sequence used for transmission of the sidelink positioning reference signal, or a sequence index of the sequence used for transmission of the sidelink positioning reference signal.

15. The method of claim 10, further comprising transmitting a subsequent sidelink positioning reference signal, wherein at least one of a resource location, a bandwidth, or a duration of the subsequent sidelink positioning reference signal is based at least in part on at least one of the bandwidth or the duration of the sidelink positioning reference signal measured by the receiver UE.

16. The method of claim 10, wherein the duration of the sidelink positioning reference signal is determined based at least in part on a mapping between a set of bandwidths and a corresponding set of durations.

17. A transmitter user equipment (UE) for wireless communication, comprising:
a memory; and
one or more processors, coupled to the memory, configured to:
perform a channel access procedure in a set of channels until the channel access procedure succeeds in a number of channels that satisfies a threshold;
detect an available bandwidth, based at least in part on the channel access procedure, for transmission of a sidelink positioning reference signal, wherein the available bandwidth is a bandwidth of the number of channels; and
transmit the sidelink positioning reference signal in the available bandwidth based at least in part on the bandwidth of the number of channels, wherein a duration of the sidelink positioning reference signal is based at least in part on the available bandwidth.

18. The transmitter UE of claim 17, wherein the duration of the sidelink positioning reference signal is shorter when the available bandwidth is larger, and wherein the duration of the sidelink positioning reference signal is longer when the available bandwidth is smaller.

19. The transmitter UE of claim 17, wherein the available bandwidth in the set of contiguous channels is detected based at least in part on performing the channel access procedure in the set of channels in an unlicensed radio frequency spectrum band.

20. The transmitter UE of claim 17, wherein the duration of the sidelink positioning reference signal is determined based at least in part on a mapping between a set of bandwidths and a corresponding set of durations, wherein information that indicates the mapping is stored by the transmitter UE.

21. The transmitter UE of claim 17, wherein the duration of the sidelink positioning reference signal is determined based at least in part on a mapping between a set of bandwidths and a corresponding set of durations, wherein the mapping is indicated in a message received by the transmitter UE.

22. The transmitter UE of claim 17, wherein the one or more processors are further configured to transmit an indication of at least one of the available bandwidth or the duration.

23. The transmitter UE of claim 22, wherein the indication is indicated using one or more transmission parameters of the sidelink positioning reference signal.

24. The transmitter of claim 23, wherein the one or more transmission parameters include at least one of a sequence used for transmission of the sidelink positioning reference signal, a seed of the sequence used for transmission of the sidelink positioning reference signal, or a sequence index of the sequence used for transmission of the sidelink positioning reference signal.

25. A receiver user equipment (UE) for wireless communication, comprising:
a memory; and
one or more processors, coupled to the memory, configured to:
determine a bandwidth used for a transmission of a sidelink positioning reference signal, wherein the bandwidth is based at least in part on a number of channels used for the transmission of the sidelink positioning reference signal;
determine a duration of the sidelink positioning reference signal based at least in part on the bandwidth; and
measure the sidelink positioning reference signal based at least in part on the bandwidth and the duration.

26. The receiver UE of claim 25, wherein the bandwidth used for the transmission of the sidelink positioning reference signal is determined based at least in part on a sidelink control signal received by the receiver UE.

27. The receiver UE of claim 25, wherein the bandwidth used for the transmission of the sidelink positioning reference signal is determined based at least in part on one or more transmission parameters associated with the sidelink positioning reference signal.

28. The receiver UE of claim 27, wherein the one or more transmission parameters include at least one of a sequence used for transmission of the sidelink positioning reference signal, a seed of the sequence used for transmission of the sidelink positioning reference signal, or a sequence index of the sequence used for transmission of the sidelink positioning reference signal.

29. The receiver UE of claim 25, wherein the one or more processors are further configured to transmit a subsequent sidelink positioning reference signal, wherein at least one of a resource location, a bandwidth, or a duration of the subsequent sidelink positioning reference signal is based at least in part on at least one of the bandwidth or the duration of the sidelink positioning reference signal measured by the receiver UE.

30. The receiver UE of claim 25, wherein the duration of the sidelink positioning reference signal is determined based at least in part on a mapping between a set of bandwidths and a corresponding set of durations.

* * * * *